Figure 1:
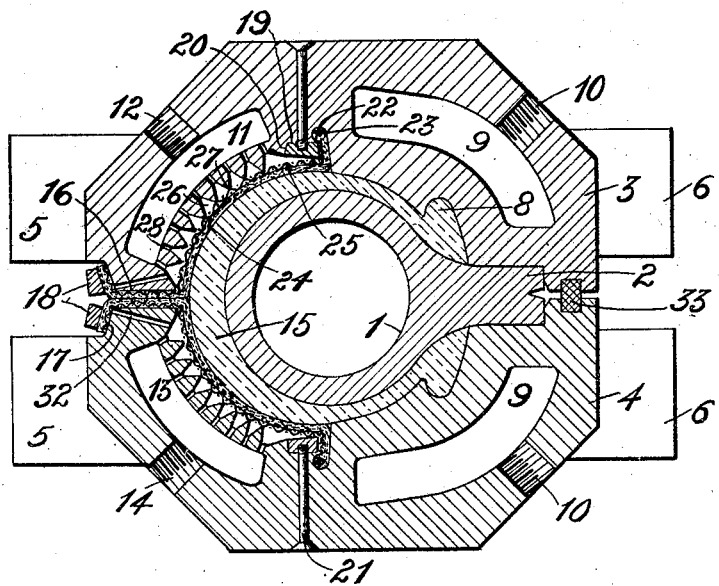

J. K. WILLIAMS.
VULCANIZING MOLD.
APPLICATION FILED AUG. 5, 1909.

943,055.

Patented Dec. 14, 1909.
2 SHEETS—SHEET 1.

Witnesses

Inventor
John K. Williams
by C. E. Humphrey
Attorney

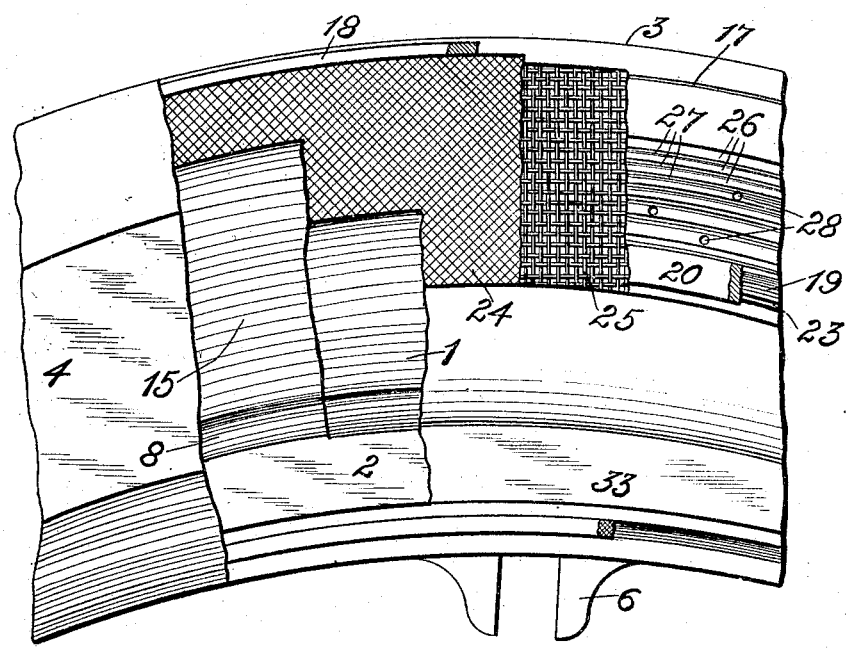

UNITED STATES PATENT OFFICE.

JOHN K. WILLIAMS, OF AKRON, OHIO, ASSIGNOR OF ONE-HALF TO THE WILLIAMS FOUNDRY AND MACHINE COMPANY, OF AKRON, OHIO, A CORPORATION OF OHIO.

VULCANIZING-MOLD.

943,055.

Specification of Letters Patent. Patented Dec. 14, 1909.

Application filed August 5, 1909. Serial No. 511,441.

*To all whom it may concern:*

Be it known that I, JOHN K. WILLIAMS, a citizen of the United States, residing at Akron, in the county of Summit and State of Ohio, have invented new and useful Improvements in Vulcanizing-Molds, of which the following is a specification.

This invention relates to apparatus of the general type shown in my application for United States Letters Patent, Serial No. 487,272, filed April 1, 1909, for manufacturing rubber articles such as vehicle wheel tires, more particularly tires of the clencher type and the general object thereof is to provide a vulcanizing mold to receive the article, with a portion of the interior of said mold provided with a recess or opening adjacent the article and with one or more layers of material which is pervious to a vulcanizing agent positioned within the recess and fashioned to conform in contour to the shape to be imparted to the article during vulcanization. Experience has demonstrated that where a portion of a mold is provided with a recess in which is positioned a layer of pervious material to hold the tire and permit the access of the vulcanizing agent therethrough to the tire, constant use tends to distort the shape of the layer of pervious material to such an extent that rubber articles made therein are consequently distorted and are not necessarily uniform. It has also been found that in positioning layers of pervious material in a mold to sustain the tread portion of a tire, it is extremely difficult to impart to the portions of the pervious material on both sides of the medial longitudinal line of the tire, an equal degree of tension and the result has been that some tires in molds provided with unsupported pervious material are not properly balanced as the pervious material is rarely evenly stretched on the two sides, resulting in portions of the tire bulging laterally on the side which is covered by the pervious material to which is imparted the lesser amount of tension.

It is therefore a primary object of this invention to provide a mold of the general type shown and described in the application heretofore referred to, which is provided with supporting means for the pervious material, so constructed as to equally support all portions of the pervious material, to the end that the tire may be properly supported at all points during the application of the vulcanizing agent thereto, thus insuring trueness and perfection in the finished product without any danger of unevenness or distortion of any portion thereof.

With the foregoing and other objects in view, the invention consists in the novel construction, combination and arrangement of parts constituting the invention to be hereinafter specifically described and illustrated in the accompanying drawings which form a part hereof wherein is shown the preferred embodiment of the invention, but it is to be understood that changes, variations and modifications can be resorted to which come within the scope of the claims hereunto appended.

Figure 2:
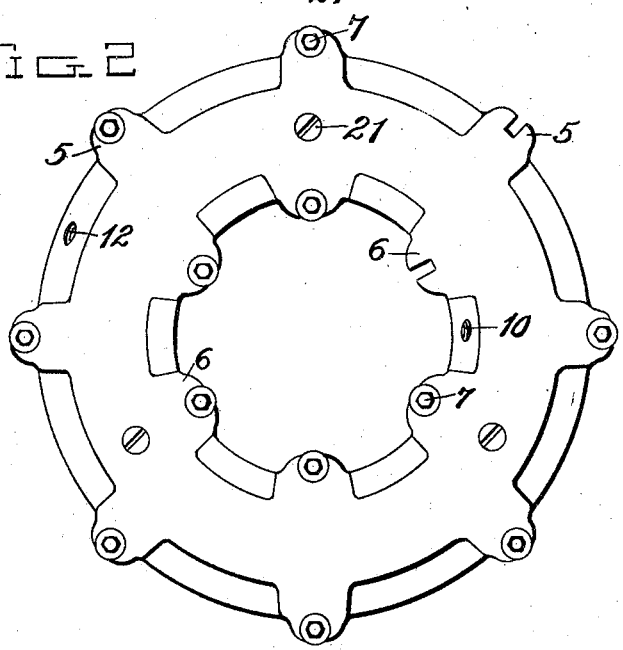

In the drawings, in which similar reference numerals indicate like parts in the different figures: Figure 1 is a transverse sectional view of a vulcanizing mold with a tire mounted upon a suitable mandrel in position therein. Fig. 2 is a plan of a two-part mold embodying this invention; and, Fig. 3 is a view in side elevation of the device shown in Fig. 1 with portions broken away to better illustrate the internal construction of the device.

Referring to the drawings in detail, the reference numeral 1 denotes an annular core or mandrel having the shape in cross section which it is desired to impart to the interior of the completed article, which in this instance is an outer casing or tube of a double-tube pneumatic tire used to illustrate the operation of this device. The inner portion of the core 1 is provided with an inwardly-projecting flange 2 which serves to strengthen the core and provides means to limit the movement of the mold sections when the same are clamped together preparatory to vulcanizing the tire. This flange also constitutes means for accurately maintaining the position of the core in the mold during the vulcanization of the tire. Each mold comprises two coöperating sections 3 and 4 intended to occupy positions on opposite sides of the core 1 and provided at intervals with registering pairs of outwardly-projecting lugs 5 and inwardly-projecting pairs of lugs 6, the members of each pair of lugs being spaced apart from each other to permit the placing between them of clamping bolts 7 which extend from the pairs of registering lugs on one member to the corresponding lugs of the other member for clamping said sections together; but as this is a common means of uniting mold sections and fully understood by persons skilled in the art, a further description thereof is believed to be unnecessary; and it will be entirely within the scope of this invention to entirely omit both the lugs and the bolts and place the mold sections when so desired in a suitable press instead of employing the bolts 7. The inner oppositely-disposed faces of the mold sections adjacent the core 1 are adapted to receive and hold the shoe-portion 8 of a tire during the vulcanization thereof. The mold sections 3 and 4 are each provided with an inner chamber 9 to which steam or other vulcanizing medium is admitted through an opening 10 and each of the mold sections is also provided with an outer chamber 11 to which steam or other vulcanizing medium is admitted through an inlet 12.

Arranged to be held in position on the core 1 is an outer tube or casing 15 of a pneumatic tire, which, as before stated, is used to illustrate the application of this invention. The outer oppositely-disposed faces of the mold sections 3 and 4 are separated to form a circumferentially-extending opening 16 for a purpose to be stated and the outer adjacent portions of both sections are provided with oppositely-disposed shoulders having inclined faces 17 each adapted to receive a clamping ring 18. Each of the mold sections is provided with a circumferentially-extending groove 19 adapted to receive a ring 20 held in its seat through the medium of a plurality of holdfast devices 21 extended through suitable openings in the body of the mold section. Extending laterally from and communicating with the grooves 19 are smaller grooves 22 in each of which is arranged to be seated a ring or hoop 23.

The invention contemplates securing in each of the grooves 22 by one or more wrappings about the hoops 23 a layer of pervious material such as fabric which is carried from thence upwardly to the opening 16 and from thence outwardly onto the inclined face of its respective mold section and there clamped through the medium of one of the rings 18. The layers of pervious material will lie in actual contacting engagement with the outer surface of the tread portion of the tire and the layers of pervious material secured in each mold section will be carried outwardly through the opening 16 and be secured on the inclined face 17 of their respective mold section, so that each layer of pervious material constitutes a fixed element of each mold section. When the mold sections are placed in contacting engagement, as shown in Fig. 1, the layers of fabric carried by both mold sections will be in abutting relation in the opening 16 and constitute a fluid-tight packing therefor.

As already stated, the layers of pervious material which are usually formed of woven fabric cannot be depended upon to maintain their shape and cannot be stretched with such evenness as to absolutely insure that the tire will not bulge laterally to one side or the other during the curing or volcanization thereof.

In order to afford proper supporting means for the layers of pervious material which are designed to actually contact with the surface of the tire and support all portions thereof approximately equally and evenly, this invention contemplates providing a reinforcing layer or strengthening element preferably composed of one or more layers of foraminous or reticulated material, designated in the drawings by the reference numeral 25 and preferably consisting of wire cloth.

The invention further contemplates securing the supporting element of foraminous or reticulated material 25 in the recesses 22 and carrying it from thence outwardly through the opening 16 onto the inclined face 17 of each of the mold sections and so positioning it that it will lie in contacting engagement with the layer of pervious material which it supports and be clamped in position on the inclined face 17 onto which it is carried by the same clamping means which are employed in clamping the layer of pervious material in connection with which it is used. Various means may be employed for supporting the foraminous layer 25 and two means are shown in the drawings which are each capable of performing this function and may be described as follows: The interior of the mold cavity in each of the mold sections adjacent the tread of the tire is provided with a plurality of circumferentially-extending grooves 26 between which are a plurality of ridges 27 extending inwardly toward the mold cavities sufficiently to engage and constitute supporting means for the layer of foraminous material 25. Each of the grooves 26 is connected by an opening 28 with the steam chamber 11 thereof, insuring a free passage of the vulcanizing agent to the surface of the layer 25, from which it passes to the pervious material 24 and from thence into actual contact with the surface of the article to be vulcanized.

In setting up a mold of this description, it is assembled somewhat as follows: Two strips, one of pervious material and another of foraminous or reticulated material such as wire cloth are cut to the appropriate shape and after being placed one upon the other with the fabric layer toward the mold cavity, their inner lapping edges are wrapped about the wire hoop 23, which in turn is forced into its respective groove 22, after which the ring 20 is seated in the recess or groove 19 and secured there through the medium of the holdfast devices 21, thus effectually compressing the two layers of material and the hoop 23 into the groove 22 and securely locking them there. The outer edges are then carried outwardly and bent over the inclined face 17 of the section. A suitable form or dummy corresponding in shape and size to the tire to be vulcanized is then pressed into the mold cavity until properly seated therein. This seating of the form stretches and shapes the two layers of material so as to cause them to conform to the outer surface of the tire body which is afterward to be placed in the mold. A clamping ring 18 is then forced onto its seat on the inclined face 17, thus securely locking the layers of material in position. This operation is repeated with the other mold section, after which the dummy or form is removed and an unvulcanized tire, suitably mounted on a mandrel or other means for fashioning the interior thereof, is placed between the abutting mold sections and after they are clamped together, the entire device is subjected to the heat of vulcanization.

In vulcanizing a tire in this type of mold, the two sections may be clamped together by the bolts 7 and then placed in a vulcanizing oven and the vulcanizing agent passes to the steam chambers through their appropriate inlets to effectually vulcanize the tire. If it is not desired to place the mold in a vulcanizing oven, suitable steam supply pipes may be connected with any one, or all of the inlets to the steam chambers, thus effectually vulcanizing the article contained in the mold sections without the necessity of placing the mold in an oven. It will be further obvious that if it is desired to admit steam to one of the steam chambers and not to the others this may be readily done by admitting steam to any selected steam chamber opposite the respective portions of the tire to which it is desired to transmit the vulcanizing heat.

In view of the fact that both the molds and the tires are cold when placed in the steam chamber used for vulcanizing the article, considerable condensation of the steam takes place and in order to secure perfect operation of the vulcanizing heat by rendering the access of steam to all portions of the tire as free as possible, suitable ducts 32 are employed to permit the water of condensation to escape, these ducts preferably leading through a suitable portion of the walls of the cavities surrounding the tread of the tire outwardly to the inclined faces 17, and suitable openings are made through the pervious material connected therewith to permit drainage of the mold cavities. The contacting layers of fabric in the opening 16 constitute a packing for the joint between the outer portions of the mold sections, and in order to prevent any possible escape of steam through the joint between the inner portions of the mold sections a suitable packing ring 33 may be employed, which is seated in suitable registering grooves in the oppositely-disposed faces of the inner portions of the mold sections.

This mold as shown and described is adapted for use in manufacturing what are known in the art as "one cure tires" by which is meant tires in which all portions thereof are completely united by one vulcanization and it is also perfectly adapted to manufacture tires by what is known as the "two cure process" wherein the carcass of the tire is placed in a complete metallic mold and semi-cured, after which the carcass is removed from the mold and an unvulcanized tread placed thereon, after which it is returned to the mold and subjected a second time to vulcanizing heat, by which process the carcass is given a harder cure than the tread by reason of the fact that it is subjected to two vulcanizations.

What I claim is:

1. A vulcanizing apparatus comprising a mold formed of a plurality of sections, each of said sections having as a component part thereof a permanently fixed lining of pervious material provided with a foraminous reinforcing medium and constituting means to permit of the passage of a vulcanizing medium and said reinforcement constituting means to prevent the distortion, of said lining during the vulcanizing operation, each of said linings and its reinforcing medium secured to its respective section.

2. A vulcanizing apparatus comprising a mold formed of a plurality of sections, each provided with a vulcanizing medium space having one wall thereof provided with openings and circumferentially extending ribs, each of said sections having as a component part thereof a lining of pervious material provided with a reinforcing medium arranged in proximity to said ribs, said pervious material constituting means to permit of the passage of the vulcanizing medium and said reinforcement for said pervious material constituting means to prevent the distortion of the pervious material during the vulcanizing operation, each of said linings and its reinforcement secured to its respective mold section.

3. A vulcanizing apparatus comprising a mold formed of a plurality of sections, each of said sections having as a component part thereof a permanently fixed reinforced lining of pervious material to permit of the passage of a vulcanizing medium, the reinforcing of said lining preventing the distortion thereof during the vulcanizing operation, each of said reinforcing linings secured to its respective mold section.

4. A vulcanizing apparatus comprising a mold formed of a plurality of sections, each of said sections having as a component part thereof a reinforced lining of pervious material to permit of the passage of a vulcanizing medium, the reinforcing of said lining preventing the distortion thereof during the vulcanizing operation, each of said reinforcing linings secured to its respective mold section, and each of said sections furthermore provided with a space constituting a chamber for a vulcanizing medium, one wall of said chamber formed of a plurality of openings and further provided with circumferentially extending ribs arranged in proximity to the reinforced lining of its respective section.

5. A vulcanizing apparatus comprising a mold formed of a plurality of sections, each of said sections provided with a recess, and further provided with a space to constitute a chamber for the reception of a vulcanizing medium, one wall of said chamber provided with openings and further having ribs, said openings establishing communication between said chamber and said recess, and a reinforced lining of pervious material mounted in each of said recesses and in proximity to said ribs, said lining of pervious material constituting means to permit of the passage of the vulcanizing medium and the reinforcement of said lining preventing the latter from distortion during the vulcanizing operation, each of said linings secured to its respective mold section.

6. A vulcanizing apparatus comprising a mold formed of a plurality of sections, each of said sections having as a component part thereof a permanently fixed reinforced lining of pervious material to permit of the passage of a vulcanizing medium, each of said linings secured to its respective section, and each of said sections furthermore provided with means for sustaining its respective reinforced lining against distortion during the vulcanizing operation.

7. A vulcanizing apparatus comprising a mold formed of a plurality of sections, each of said sections having as a component part thereof a permanently fixed reinforced lining of pervious material to permit of the passage of a vulcanizing medium, each of said linings secured to its respective section, and each of said sections furthermore provided with means for sustaining its respective reinforced lining against distortion during the vulcanizing operation, each of said mold sections furthermore provided with a space to constitute a steam chamber, one wall of said chamber provided with an opening for supplying the vulcanizing medium against the lining of its respective mold section.

8. A vulcanizing apparatus comprising a mold formed of a plurality of sections, each of said sections having as a component part thereof a composite lining formed of a strip of pervious material and a strip of foraminous material positioned against one face of the strip of pervious material, each of said strips constituting the composite lining permanently secured to its respective mold section.

9. A vulcanizing apparatus comprising a mold formed of a plurality of sections, each of said sections having as a component part thereof a permanently fixed composite lining formed of a strip of pervious material and a strip of foraminous material positioned against one face of the strip of pervious material, each of said strips constituting the composite lining secured to its respective mold section, each of said mold sections furthermore provided with means to sustain its respective composite lining in position to prevent distortion of the said lining during the vulcanizing operation.

10. A vulcanizing apparatus comprising a mold formed of a plurality of sections, each of said sections having as a component part thereof a permanently fixed composite lining formed of a strip of pervious material and a strip of foraminous material positioned against one face of the strip of pervious material, each of said strips constituting the composite lining secured to its respective mold section, each of said mold sections furthermore provided with means to sustain its respective composite lining in position to prevent distortion of the said lining during the vulcanizing operation, and each of said mold sections further having a space to constitute a vulcanizing medium chamber having one wall thereof provided with an opening for supplying the vulcanizing medium against said composite pervious lining.

In testimony whereof I have hereunto set my hand in presence of two subscribing witnesses.

JOHN K. WILLIAMS.

Witnesses:
GLENARA FOX,
A. E. KLING.